United States Patent
Soderlund

(10) Patent No.: US 11,178,032 B2
(45) Date of Patent: Nov. 16, 2021

(54) CONNECTIVITY MONITORING FOR DATA TUNNELING BETWEEN NETWORK DEVICE AND APPLICATION SERVER

(71) Applicant: NOKIA SOLUTIONS AND NETWORKS OY, Espoo (FI)

(72) Inventor: Jani Olavi Soderlund, Vantaa (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 38 days.

(21) Appl. No.: 16/612,864

(22) PCT Filed: May 12, 2017

(86) PCT No.: PCT/EP2017/061423
§ 371 (c)(1),
(2) Date: Nov. 12, 2019

(87) PCT Pub. No.: WO2018/206115
PCT Pub. Date: Nov. 15, 2018

(65) Prior Publication Data
US 2020/0145309 A1    May 7, 2020

(51) Int. Cl.
*G06F 15/173* (2006.01)
*H04L 12/26* (2006.01)
*H04L 12/46* (2006.01)
*H04L 12/733* (2013.01)
*H04L 29/12* (2006.01)

(52) U.S. Cl.
CPC ...... *H04L 43/0811* (2013.01); *H04L 12/4633* (2013.01); *H04L 43/0823* (2013.01);
(Continued)

(58) Field of Classification Search
CPC ............. H04L 43/0811; H04L 12/4633; H04L 43/0823; H04L 43/10; H04L 45/20; H04L 61/2007
(Continued)

(56) References Cited

U.S. PATENT DOCUMENTS

| 2012/0020318 A1* | 1/2012 | Naoe | H04W 8/26 370/329 |
|---|---|---|---|
| 2013/0022033 A1* | 1/2013 | Shi | H04W 76/12 370/338 |
| 2015/0110095 A1* | 4/2015 | Tan | H04L 61/2007 370/338 |

FOREIGN PATENT DOCUMENTS

EP    2 590 368 A1    5/2013

OTHER PUBLICATIONS

"Yegin Alper et al: "Terminal-centric distribution and orchestration of IP mobility for 5G networks," IEEE Communications Magazine, vol. 52, No. 11, Nov. 1, 2014, pp. 86-92, XP011564617."

(Continued)

*Primary Examiner* — Duyen M Doan
(74) *Attorney, Agent, or Firm* — Squire Patton Boggs (US) LLP

(57) ABSTRACT

Upon a user equipment attaching to a core network of a cellular communications network system, an IP address is allocated to the user equipment by a network device of the core network, for tunneling data relating to the user equipment between the network device and an application server. The IP address is allocated from a subnetwork, and the allocating is performed based on path monitoring information. If the path monitoring information contains an IP address of at least one subnetwork, the subnetwork is selected from the at least one subnetwork. Then it is checked if the path monitoring information contains a combination of the subnetwork's IP address and the application server's IP address. In case the combination is not contained in the path monitoring information, a path indicated by the combination of the subnetwork's IP address and the application server's IP address is added to the path monitoring information.

15 Claims, 7 Drawing Sheets

(52) U.S. Cl.
CPC .............. *H04L 43/10* (2013.01); *H04L 45/20* (2013.01); *H04L 61/2007* (2013.01)

(58) Field of Classification Search
USPC .................................................. 709/224–225
See application file for complete search history.

(56) References Cited

OTHER PUBLICATIONS

International Search Report and Written Opinion dated Jan. 17, 2018 corresponding to International Patent Application No. PCT/EP2017/061423.
T-Mobile USA Inc., "Enhancing IP Allocation between UPF and SMF," 3GPP Draft; S2-172030, SA WG2 Meeting #120, Mar. 27-31, 2017, Busan, South Korea, Mar. 26, 2017, XP051247763.
3GPP TS 23.401 V14.3.0 (Mar. 2017), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 14), Mar. 2017.
3GPP TS 23.501 V0.4.0 (Apr. 2017), Technical Specification, 3rd Generation Partnership Project; Technical Specification Group Services and System Aspects; System Architecture for the 5G System; Stage 2 (Release 15), Apr. 2017.
3GPP TR 23.720 V13.0.0 (Mar. 2016), Technical Report, 3rd Generation Partnership Project; Technical Specification Group Services and System Aspects; Study on architecture enhancements for Cellular Internet of Things (Release 13), Mar. 2016.

* cited by examiner

CONNECTIVITY MONITORING FOR DATA TUNNELING BETWEEN NETWORK DEVICE AND APPLICATION SERVER

BACKGROUND OF THE INVENTION

Field of the Invention

The present invention relates to connectivity monitoring for data tunneling between a network device of a core network of a cellular communications network system and an application server. In particular, the present invention is applicable to cellular Internet of Things (CIoT) in Evolved Packet Core (EPC).

Related Background Art

UE (User Equipment) devices such as CIoT devices may be simplified by use of non-IP (non-Internet Protocol) data, allowing CIoT devices to communicate with a server side without the need for Internet Protocol (IP) stack. Support of non-IP data is part of 3GPP ($3^{rd}$ Generation Partnership Project) CIoT optimizations. A specific 3GPP PDN (Packet Data Network) type "non-IP" is used for non-IP data.

In general, data (IP data/non-IP data/unstructured data) can be relayed via a network device (e.g. a P-GW (Packet Gateway), UPF (User Plane Function)) of a core network (e.g. EPC, 5GC) of a cellular communications network system between a UE and an application server (AS). Monitoring connectivity with respect to the data which may be related to some critical application where loss of connection is not acceptable or even not allowed is difficult since monitoring connectivity by the UE or the AS is not sufficient. This is because only the P-GW, UPF is able to switch traffic to another tunnel and there is no way for the UE or AS to inform the P-GW, UPF of a path failure.

Prior art which is related to this technical field can e.g. be found in 3GPP TR 23.720 describing relaying data via P-GW between UE and AS, and 3GPP TS 23.401 describing UDP/IP tunnelling in SGi interface. For 5GC, similar description can be found in 3GPP TS 23.501.

The following meanings for the abbreviations used in this specification apply:

5GC $5^{th}$ Generation Core Network
3GPP $3^{rd}$ Generation Partnership Project
AS Application Server
CIoT Cellular Internet of Things
C-SGN CIoT Serving Gateway Node
ECMP Equal-Cost Multi-Path
EPC Evolved Packet Core
GW Gateway
ICMP Internet Control Message Protocol
IP Internet Protocol
MME Mobility Management Entity
NH Next-Hop
PDN Packet Data Network
P-GW Packet Data Gateway
RADIUS Remote Authentication Dial-In User Service
SCEF Service Capability Exposure Function
SGi 3GPP Standard interface between P-GW and packet data networks
UDP User Datagram Protocol
UPF User Plane Function
UE User Equipment

SUMMARY OF THE INVENTION

At least some embodiments of the invention aim at overcoming the above drawback and enabling useful connectivity monitoring for data tunneling between a network device of a core network of a cellular communications network system and an application server.

According to some aspects of the invention, this is achieved by the methods, apparatuses and computer program product as defined in the appended claims.

According to at least some embodiments of the invention, the provided connectivity monitoring is scalable and enables redundancy for data delivery.

With the connectivity monitoring provided by at least some embodiments of the invention, millions of CIoT devices, each with own "tunnel", i.e. unique source/destination address and source/destination port tuple, can be handled. For example, according to at least some embodiments of the invention, a single ping message is used to check connectivity for a whole subnetwork instead of sending ping messages for all UEs of the subnetwork.

At least some embodiments of the invention enable triggering selection of an alternative path between the network device and the application server for data tunneling.

In the following the invention will be described by way of embodiments thereof with reference to the accompanying drawings.

BRIEF DESCRIPTION OF THE DRAWINGS

FIG. 2 shows a schematic diagram illustrating P-GW SGi side UDP/IP tunneling towards AS.

DESCRIPTION OF THE EMBODIMENTS

Figure 1:
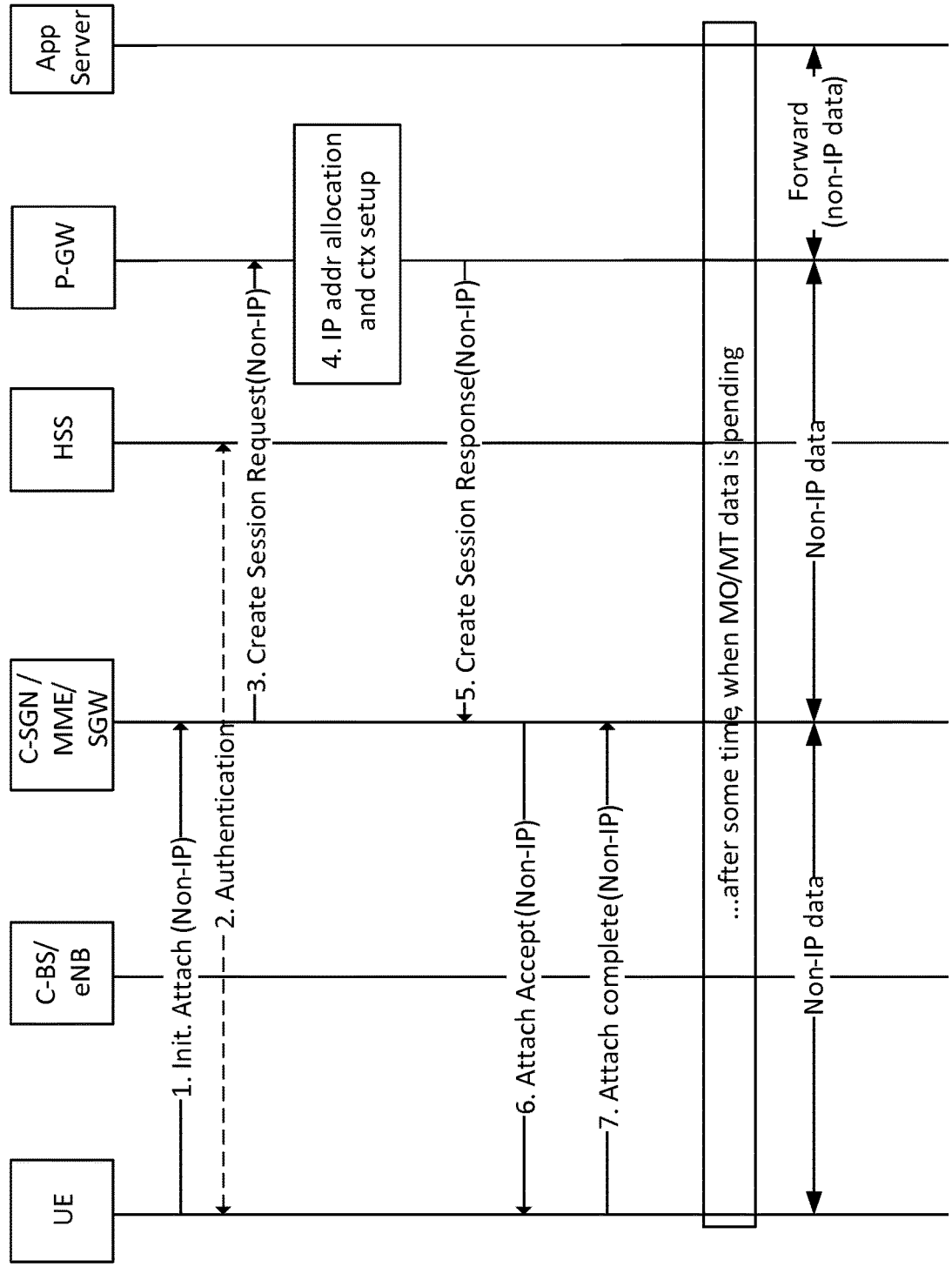
FIG. 1 shows a schematic signaling diagram illustrating transmitting non-IP data between a UE and an AS via a P-GW.
Figure 2:
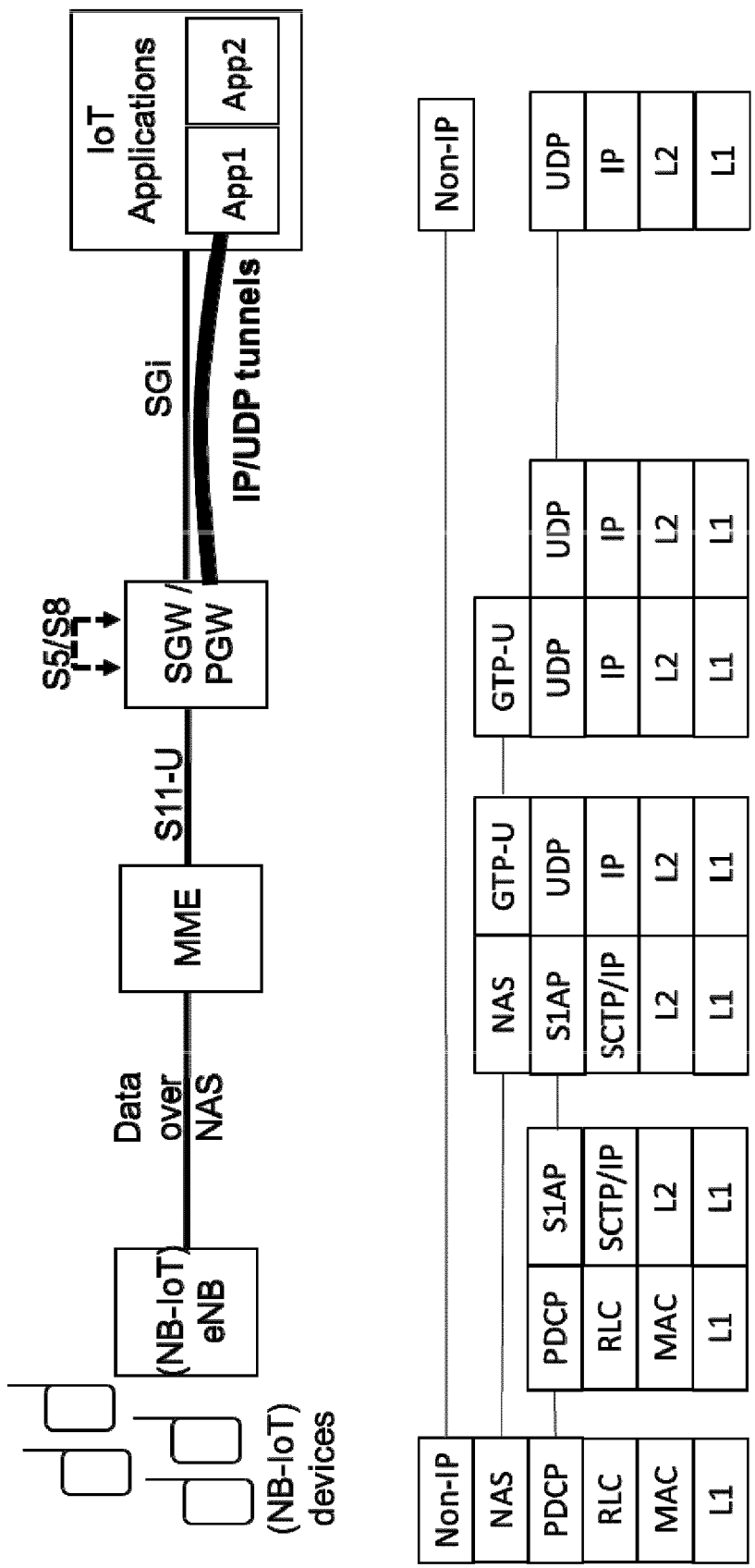

FIG. 1 shows relaying non-IP data via a network device (e.g. a P-GW) between a UE and an AS. Forwarding non-IP data between the P-GW and the AS can be performed by UDP/IP (User Datagram Protocol/Internet Protocol) tunneling in an SGi interface. FIG. 2 shows P-GW SGi side UDP/IP tunneling towards the AS.

It is to be noted that the invention is not limited to tunneling non-IP data between P-GW and AS, but comprises also tunneling IP data between P-GW and AS, and tunneling unstructured PDU data between UPF and AS. FIG. 1 represents merely an example of tunneling data between P-GW and AS.

Further, IP data means data transmitted using Internet Protocol (IP), and non-IP data means data transmitted using a protocol other than Internet Protocol (IP).

When a UE (e.g. a CIoT device) without IP stack attaches to a core network (e.g. EPC, 5GC) of a cellular communications network system, a network device (e.g. P-GW, C-SGN, UPF) of the core network allocates an IP address to the UE for tunneling non-IP data relating to the UE between the network device and an AS, as e.g. illustrated in FIG. 1 "4. IP address allocation and context setup".

Similarly, when a UE (e.g. a CIoT device) with IP stack attaches to the core network of the cellular communications network system, the network device (e.g. P-GW, C-SGN, UPF) of the core network may allocate an IP address to the UE for tunneling IP data relating to the UE between the network device and an AS.

In the following description, the network device comprises a packet gateway (P-GW) with user plane, being either P-GW in EPC or UPF in 5GC. Further, in EPC, S-GW (C-SGN) and P-GW are separate elements, which may be logically combined.

Active monitoring for basic connectivity check between IP peers (e.g. the network device and the AS) comprises e.g. use of ping, i.e. ICMP echo messaging. This active monitoring approach is essentially one-directional, but it also checks the return path. If activated not only from the side of the network device but also from the AS side, the approach can also detect and react to connectivity failures. Note that this approach does not check all possible paths between the network device and the AS, as a transport network may and usually will contain multiple paths, but this is not needed since only overall end-to-end connectivity verification is important for this approach.

A target on top of the active monitoring approach in a mobile network and CIoT scenario is to avoid the need for individually checking connectivity status for a massive amount of connections, i.e. one check per CIoT device. According to at least some embodiments of the invention, a path monitoring algorithm is used e.g. in the P-GW to select a set of source/destination IP address pairs which represent a required majority of tunnels and satisfy operator resiliency requirements.

According to ping/ICMP echo messaging, a client (e.g. P-GW, AS) can trigger a ping message towards individual destinations from a selected source interface/address. Missing responses (timeout Y) for X times notifies the client that a connectivity problem has occurred, which then can trigger corrective actions, e.g. switch to use a backup tunnel or at least inform an operator e.g. by indicating an alarm. The error situation may then cause the connectivity checks over the failed tunnel to be continued with a slower pace (at a lower rate/with longer interval between messages) to save resources. Successful operation may restore the tunnel to the use, and depending on local configuration the traffic may be actively switched back to this original tunnel. In the end, the operator must be able to decide the granularity needed for the connectivity verification, i.e. find right balance between increased resource utilization and increased resiliency.

Figure 3:
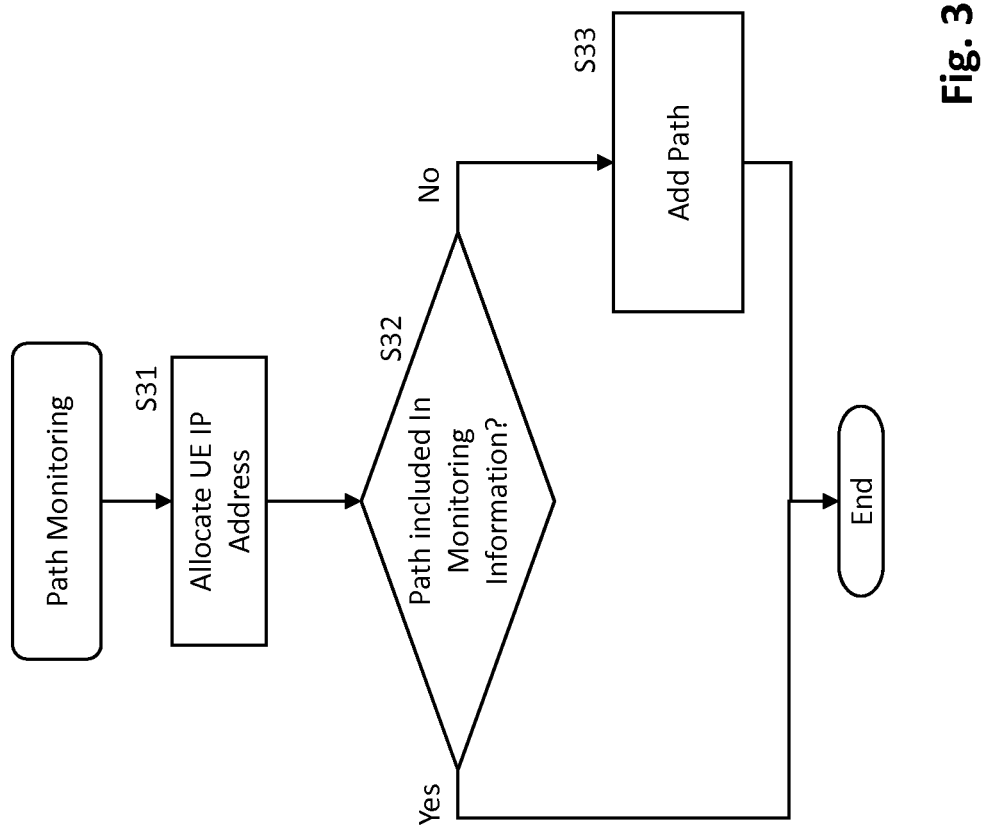
FIG. 3 shows a flowchart illustrating a process for path monitoring according to at least some embodiments of the invention.

FIG. 3 shows a flowchart illustrating a process for path monitoring according to at least some embodiments of the invention. The process can be executed by a network device (e.g. P-GW, C-SGN, UPF, etc.) of a core network (e.g. EPC, 5GC) of a cellular communications network system (e.g. CIoT system).

In step S31, when a user equipment (e.g. a CIoT device) attaches to the core network, an IP address is allocated to the user equipment for tunneling data relating to the user equipment between the network device and an application server. In particular, the IP address belonging to a subnetwork is allocated based on path monitoring information which comprise combinations of IP addresses of subnetworks and application servers, the combinations indicating paths between the subnetworks and the application servers. Preferably, the IP address of a subnetwork is allocated, which is selected from the subnetworks the IP addresses of which are contained in the path monitoring information.

In step S32 it is checked if the path monitoring information contains a combination of the subnetwork's IP address and the application servers IP address. In case the combination is not contained in the path monitoring information (No in step S32), in step S33 a path indicated by the combination of the subnetwork's IP address and the application servers IP address is added to the path monitoring information, and the process ends. If Yes in step S32, the process ends.

The paths between the network device and the application servers are monitored based on the path monitoring information.

A path monitoring algorithm according to at least some embodiments of the invention, that avoids monitoring of all individual connections, comprises prioritizing UE IP allocation from subnetworks that are already covered with active monitoring. Further, the path monitoring algorithm comprises path monitoring management, e.g. eliminating unnecessary monitoring activations.

Figure 4:
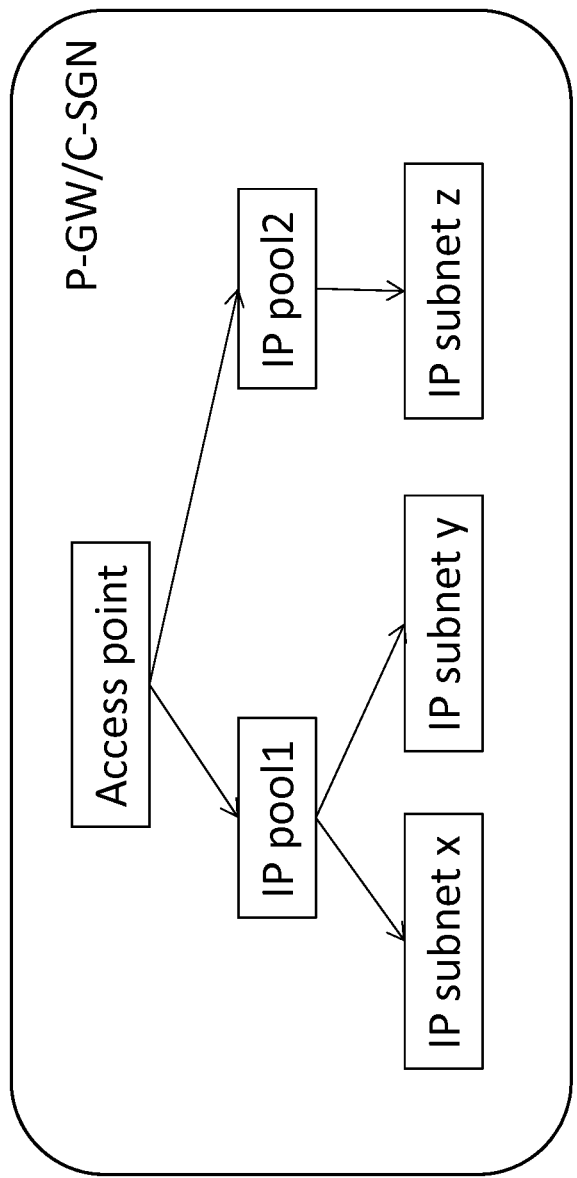
FIG. 4 shows a schematic block diagram illustrating IP pools and subnetworks for UE IP address allocation in a P-GW/C-SGN according to at least some embodiments of the invention.

In a local IP allocation solution, IP subnetworks (organized as IP pools as illustrated in FIG. 4) are configured to the P-GW/C-SGN by an operator. As shown in FIG. 4, the P-GW/C-SGN comprises an access point that has access to IP pools (IP pool1, IP pool2), which in turn have access to IP subnetworks (IPsubnet x, IP subnet y, IP subnet z).

Other static and dynamic IP address allocation solutions may receive a UE IP address from an external source, so that it is already included in a create session request towards the P-GW, or queried for example from AAA, DHCP or L2TP server. The path monitoring according to at least some embodiments of the invention does not as such care about the source of the IP address, but there has to be an option to tell which IP subnetworks can be aggregated and which not. For example, individual static addresses from the same IP subnetwork may be allocated to UEs connected to different P-GWs/C-SGNs, and in this case aggregation cannot be done.

According to an embodiment of the invention, by the path monitoring algorithm all source addresses belonging to the same IP subnetwork are pooled together towards a particular destination IP address from a particular interface to a single monitoring connection. This can be enhanced by further aggregating the IP subnetworks, removing the local interface from the combination (e.g. due to system internal failure detection and recovery via multiple interfaces in load balancers or other front-ends) which will be described in more detail below, or other mechanisms to further limit the total number of connectivity checks needed.

Figure 5:
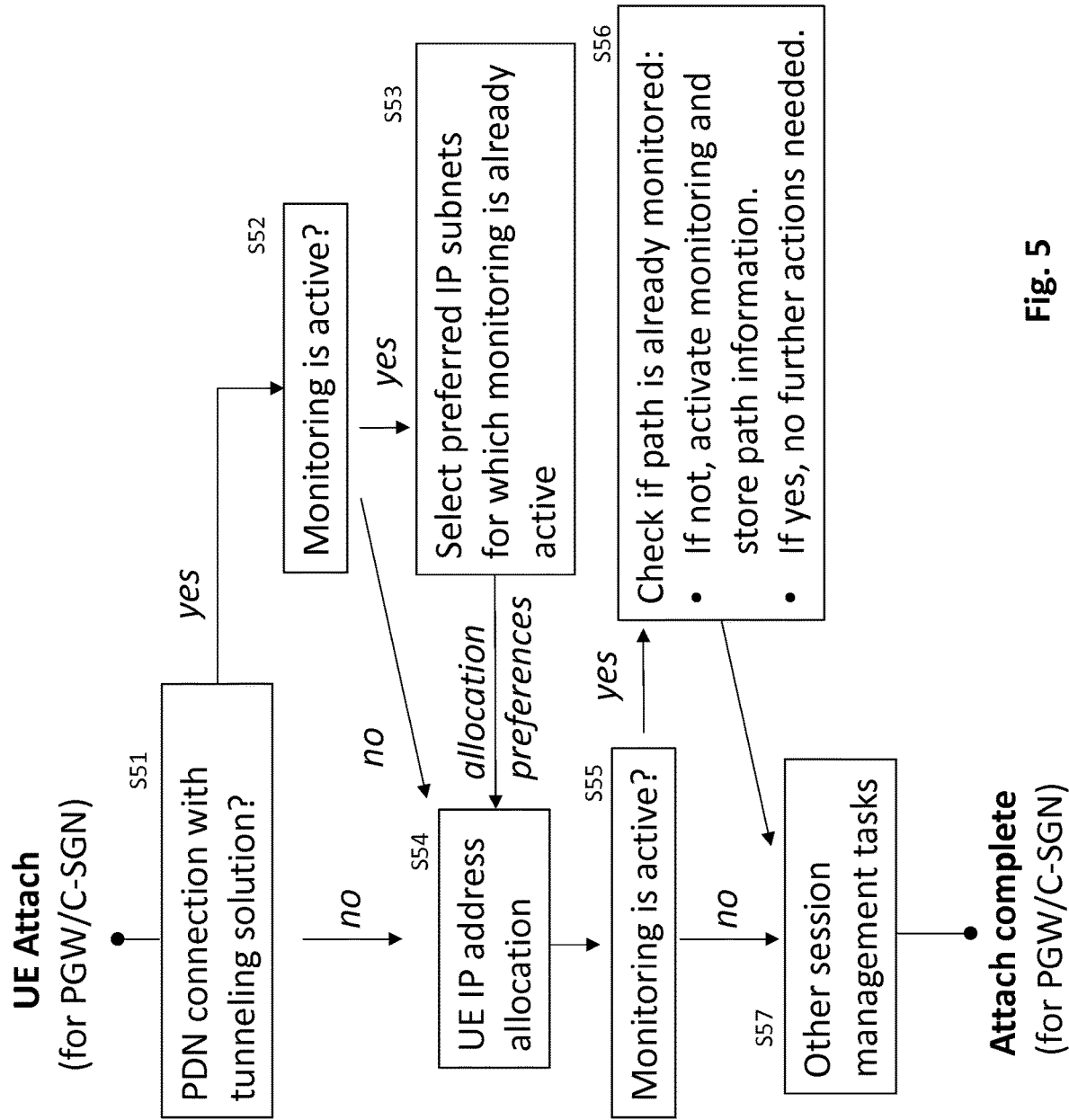
FIG. 5 shows a flowchart illustrating path monitoring in P-GW/C-SGN session management according to at least some embodiments of the invention.
Figure 6:
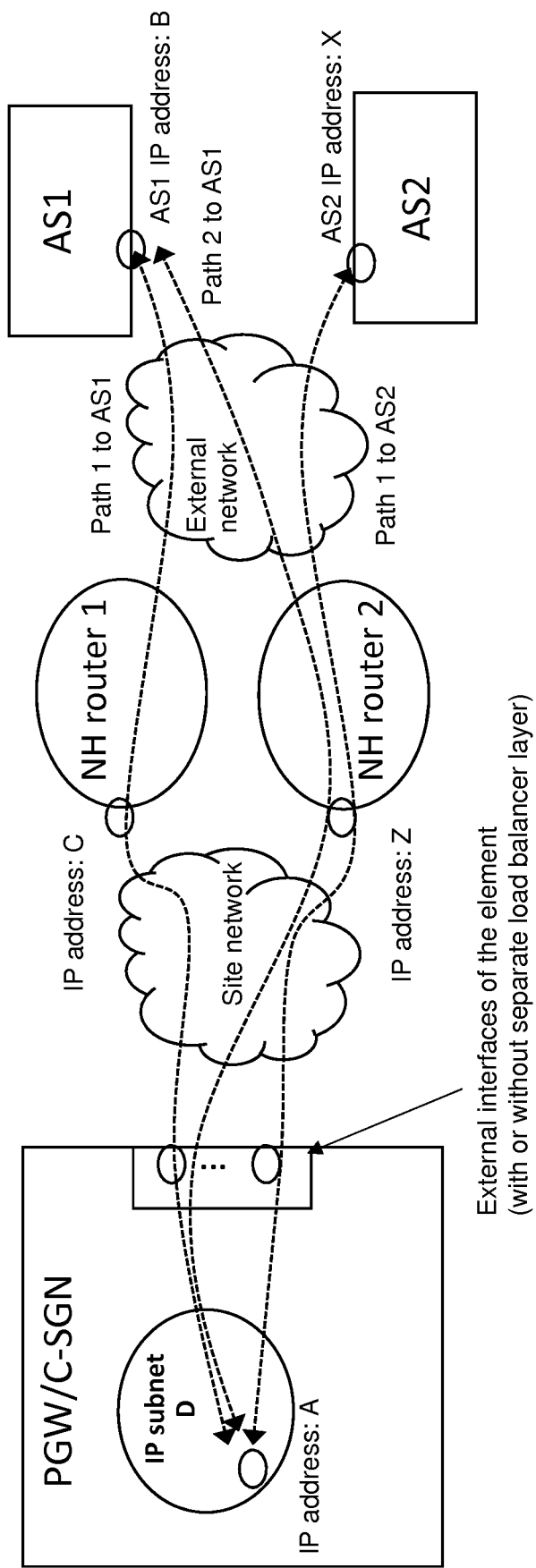
FIG. 6 shows a schematic diagram illustrating paths and elements/networks between P-GW/C-SGN and application servers according to at least some embodiments of the invention.

In the following, an example is given for the path monitoring algorithm according to at least some embodiments of the invention, referring to FIGS. 5 and 6. FIG. 5 shows a flowchart illustrating path monitoring in P-GW/C-SGN session management according to at least some embodiments of the invention. FIG. 6 shows a schematic diagram illustrating paths and elements/networks between P-GW/C-SGN and application servers according to at least some embodiments of the invention.

Referring to FIG. 6, already known information is an AS1 IP address "B", an AS2 IP address "X", an NH IP address "C" and an NH IP address "Z", which are the addresses of the next-hop in IP forwarding, either system internal or towards external L3 device, i.e. site router (NH router 1, NH router 2), and path monitoring information "I" (not shown in FIG. 6), which is a list of monitored paths that is initially empty.

In case of a UE attach, in step S51 of the process shown in FIG. 5 it is checked by the PG-W/C-SGN if PDN connection with tunneling solution is needed, i.e. if the P-GW has to locally select a tunnel based on APN configuration. If Yes in step S51, the process advances to step S52 in which it is checked if connectivity (i.e. path) monitoring is active. If path monitoring is active, in step S53 preferred IP subnetworks are selected for which path monitoring is already active, based on the path monitoring information I. Such determined allocation preferences are forwarded to the next step S54. Otherwise, if No in steps S51 and S52, the process advances directly to step S54.

In step S54, a UP IP address "A" is allocated. In case the process sequence is S51→S52→S54, the allocation preferences which are based on the path monitoring information I are used for allocating A from a subnetwork which is already being monitored.

The resulting IP subnetwork D shown in FIG. 6, which contains IP address A, can be a local (VM/node) subnetwork or a system-wide subnetwork, which depends on configuration and network element implementation. "D" indicates the IP subnetwork after all aggregation has taken place.

Then, in step S55 of FIG. 5 it is checked if path monitoring is active. If Yes in S55, the process proceeds to step S56 in which it is checked if a path from D to B via C is already being monitored, i.e. contained in the path monitoring information I. In case this path is not already being monitored, in step S56 monitoring for this particular [D, B, C] combination is triggered and this combination, i.e. path, it stored in the path monitoring information I. In other words, in the path monitoring information I it is stored that [D, B, C] is being monitored.

In case the above-described path is already being monitored, i.e. contained in the path monitoring information I, no further actions are performed in step S56. The process then proceeds to step S57, in which other session management tasks may be performed by the P-GW/C-SGN. The same applies in case the path monitoring is not active in step S55 and the process directly proceeds to step S57. Finally, after step S57 the UE attach is complete with respect to the P-GW/C-SGN.

Including the L3 Next Hop into the combination is optional. There may be cases where it is not required due to the redundancy built-in to the network topology e.g. via use of multiple redundant paths via Equal-Cost Multi-Path (ECMP). With ECMP, it is not necessary to monitor individual paths between P-GW/C-SGN and the site router(s), since the network will handle the monitoring and converge automatically to re-enable connectivity if a failure is detected. According to at least some embodiments of the invention, path monitoring is implemented in the boundary between the P-GW/C-SGN element and the L3 site network, irrespective of the P-GW/C-SGN external interfacing solution like use of internal or external, software or hardware based load balancers or direct connectivity to individual nodes/(micro-)services which together comprise the actual network element function.

Similarly, according to an embodiment of the invention, a source IP interface "S" in the P-GW/C-SGN side may optionally be taken into account by adding it to the [D, B, C] tuple, resulting in a [D, B, C, S] tuple.

FIG. 6 illustrates the path from the IP subnetwork D to AS1 as "path 1 to AS1", which is obtained by the above-described example of allocating IP address A to the UE attaching the core network. FIG. 6 further illustrates an alternative "path 2 to AS1" between IP subnetwork D and AS1, as well as a "path 1 to AS2" between IP subnetwork D and AS2.

According to at least some embodiments of the invention, the path monitoring information I comprises combinations of the IP addresses of the subnetworks and the IP addresses of the application servers. An example of such combinations is [D, B] containing IP address D of the IP subnetwork D and IP address B of application server AS1.

According to at least some embodiments of the invention, the path monitoring information I comprises combinations of the IP addresses of the subnetworks, the IP addresses of the application servers and IP addresses of units representing a next hop when tunneling data from the network device to the application servers. An example of such combinations is [D, B, C] containing IP address D of the IP subnetwork D, IP address B of application server AS1 and IP address C of NH router 1.

According to at least some embodiments of the invention, the path monitoring information I comprises combinations of the IP addresses of the subnetworks, the IP addresses of the application servers and IP addresses of interfaces of the network device, used for tunneling data from the network device to the application servers. An example of such combinations is [D, B, S] containing IP address D of the IP subnetwork D, IP address B of application server AS1 and IP address S of the source IP interface in the P-GW/C-SGN side.

According to at least some embodiments of the invention, the path monitoring information I comprises combinations of the IP addresses of the subnetworks, the IP addresses of the application servers, the IP addresses of units representing a next hop when tunneling data from the network device to the application servers, and the IP addresses of interfaces of the network device, used for tunneling data from the network device to the application servers. An example of such combinations is [D, B, C, S] containing IP address D of the IP subnetwork D, IP address B of application server AS1, IP address C of NH router 1 and IP address S of the source IP interface in the P-GW/C-SGN side.

According to at least some embodiments of the invention, the path monitoring algorithm comprises reacting to system/ infrastructure events, e.g. dynamic node (VM/container) scaling in/out, next-hops disappearing from forwarding table due to link failures or other network topology changes. In reaction to such events, monitoring for selected paths is re-activated based on current path monitoring information I. Any path contained in the path monitoring information that has become stale needs to be re-evaluated and re-activated if still needed. This part of the path monitoring algorithm is active in the P-GW/C-SGN all the time, and is not related to UE activity.

For example, referring to FIG. 6, in case a path monitoring (e.g. ping) message is transmitted on path 1 to AS1 and no response is received from AS1 to this path monitoring message, i.e. the path monitoring reveals a path failure on path 1 to AS1, according to an embodiment of the invention, switching to path 2 to AS1 indicated by the path monitoring information I is performed by the P-GW/C-SGN. Further, according to an embodiment of the invention, path 1 to AS1 is re-evaluated and re-activated if still needed. According to an embodiment of the invention, the path failure on path 1 to AS1 is notified to the operator of the P-GW/C-SGN. Further, according to an embodiment of the invention, a path monitoring message, e.g. ping message, is transmitted on path 1 to AS1 having a failure with a cycle lower than a cycle used for transmitting a path monitoring message, e.g. ping message, on a path having no path failure. For example, on path 1 to AS1 having a failure, path monitoring messages are transmitted with a first cycle (i.e. at a first rate), and on the path having no path failure, path monitoring messages are transmitted with a second cycle (i.e. at a second rate), where the first rate is lower than the second rate, i.e. an interval between path monitoring messages on path 1 to AS1 is longer than an interval between path monitoring messages on the path having no path failure.

In case the UE detaches from the core network, the UE IP address is deallocated by the network element, e.g. the P-GW/C-SGN. According to at least one embodiment of the invention, if the UE IP address A which is deallocated was the last of the IP addresses allocated from subnetwork D, the path monitoring can be stopped, and the path monitoring information I is updated accordingly. For example, according to an embodiment of the invention, when deallocating the IP address A of the user equipment upon the user equipment detaching from the core network, it is checked by the network element, based on the path monitoring information I, if the IP address A of the user equipment is the only one allocated from the subnetwork D. If the IP address A is the only one, the path monitoring information I is updated by deleting all paths indicated by combinations comprising the subnetwork's IP address D.

Figure 7:
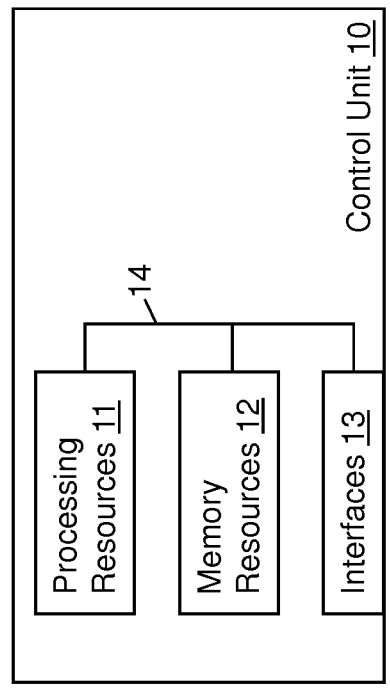
FIG. 7 shows a schematic block diagram illustrating a configuration of a control unit in which examples of embodiments of the invention are implementable.

Now reference is made to FIG. 7 which shows a schematic block diagram illustrating a configuration of a control unit 10 in which examples of embodiments of the invention are implementable. The control unit 10 comprises memory resources (memory circuitry) 11 that store a program, processing resources (processing circuitry) 12 and interfaces 13, which are connected via a connection 14.

According to an embodiment of the invention, the control unit 10 is part of and/or is used by a network element of a core network of a cellular communications network system, e.g. the P-GW/C-SGN shown in FIG. 6. Then, the interfaces 13 are used for performing bidirectional communications with an application server, e.g. the AS1 shown in FIG. 6.

The program stored in the memory resources 11 is assumed to include program instructions that, when executed by the processing resources 12, enable the network element/the application server to operate in accordance with the exemplary embodiments of this invention, as detailed above.

In general, the exemplary embodiments of this invention may be implemented by computer software stored in the memory resources 11 and executable by the processing resources 12 of the network element/the application server, or by hardware, or by a combination of software and/or firmware and hardware in the network element and/or the application server.

In general, the various embodiments of the UE can include, but are not limited to, CIoT devices, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memory resources 11 may be of any type suitable to the local technical environment and may be implemented using any suitable data storage technology, such as semiconductor based memory devices, magnetic memory devices and systems, optical memory devices and systems, fixed memory and removable memory. The processing resources 12 may be of any type suitable to the local technical environment, and may include one or more of general purpose computers, special purpose computers, microprocessors, digital signal processors (DSPs) and processors based on a multi core processor architecture, as non-limiting examples.

According to an embodiment of the present invention, a network device of a core network of a cellular communications network system is provided. The network device may include and/or use the control unit 10 shown in FIG. 7.

The network device comprises allocating means for, upon a user equipment attaching to the core network, allocating an internet protocol (IP) address to the user equipment for tunneling data relating to the user equipment between the network device and an application server. The IP address is allocated from a subnetwork, and is allocated based on path monitoring information. If the path monitoring information contains an IP address of at least one subnetwork, the subnetwork is selected from the at least one subnetwork.

The network device further comprises checking means for checking if the path monitoring information contains a combination of the subnetwork's IP address and the application servers IP address, and adding means for, in case the combination is not contained in the path monitoring information, adding a path indicated by the combination of the subnetwork's IP address and the application server's IP address to the path monitoring information.

According to an embodiment of the invention, the data relating to the user equipment is one of non-IP data, IP data, and unstructured data, e.g. unstructured PDU data.

According to an embodiment of the invention, the network device comprises monitoring means for monitoring paths indicated by the path monitoring information.

According to an embodiment of the invention, the subnetwork comprises at least one of the following:
  a local subnetwork of the network device; and
  a subnetwork of the cellular communications network system.

According to an embodiment of the invention, the path monitoring information comprises at least one of the following:
  combinations of IP addresses of subnetworks and application servers, the combinations indicating paths between the subnetworks and the application servers;
  combinations of the IP addresses of the subnetworks, the IP addresses of the application servers and IP addresses of units representing a next hop when tunneling data from the network device to the application servers; and
  combinations of the IP addresses of the subnetworks, the IP addresses of the application servers and IP addresses of interfaces of the network device, used for tunneling data from the network device to the application servers.

According to an embodiment of the invention, the monitoring means performs transmitting a path monitoring message on a selected path selected from the paths indicated by the path monitoring information, and checking if a response to the path monitoring message is received.

According to an embodiment of the invention, in case a response to the path monitoring message transmitted on a first path as the selected path is not received, which indicates a path failure on the first path, the first path being between a first subnetwork and a first application server, the monitoring means performs at least one of the following:

switching to a second path of the paths indicated by the path monitoring information, the second path being between the first subnetwork and the first application server;
re-evaluating the first path;
re-activating the first path;
notifying the path failure on the first path; and
transmitting a path monitoring message on the first path with a cycle lower than a cycle used for transmitting a path monitoring message on a path having no path failure.

According to an embodiment of the invention, when the allocating means deallocates the IP address of the user equipment upon the user equipment detaching from the core network, the checking means performs checking, based on the path monitoring information, if the IP address of the user equipment is the only one allocated from the subnetwork and, if the IP address is the only one, the adding means performs updating the path monitoring information by deleting all paths indicated by combinations comprising the subnetwork's IP address.

According to an embodiment of the invention, the network device comprises at least one of a packet gateway of an evolved packet core network a serving gateway node of an evolved packet core network, and a user plane function of a fifth generation core network.

According to an embodiment of the invention, the allocating means, checking means, adding means and monitoring means are implemented by the memory resources 11 and the processing resources 12 of the control unit 10. According to another embodiment of the invention, the allocating means, checking means, adding means and monitoring means are implemented by the memory resources 11, the processing resources 12 and the interfaces 13 of the control unit 10.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method, comprising:
upon a user equipment attaching to a core network of a communications network system, allocating an internet protocol (IP) address to the user equipment for tunneling data relating to the user equipment between a network device of the core network and an application server,
wherein the allocating is performed based on path monitoring information for the tunneling of the data,
wherein, if the path monitoring information contains an IP address of IP addresses, wherein the IP addresses are associated with subnetworks, a subnetwork is selected from the subnetworks,
wherein the selected subnetwork comprises at least one of: a local subnetwork of the network device, and a subnetwork of cellular communications network system,
wherein the IP address belongs to the selected subnetwork;
checking if the path monitoring information contains a combination of the IP address of the selected subnetwork and an IP address of the application server; and
in case the combination is not contained in the path monitoring information, adding a path indicated by the combination of the IP address of the selected subnetwork and the IP address of the application server to the path monitoring information.

2. The method of claim 1, wherein the data is one of:
non-IP data,
IP data, and
unstructured data.

3. The method of claim 1, comprising:
monitoring paths indicated by the path monitoring information.

4. The method of claim 1, wherein the path monitoring information comprises at least one of the following:
combinations of the IP addresses of the subnetworks and application servers, the combinations indicating paths between the subnetworks and the application servers;
combinations of the IP addresses of the subnetworks, the IP addresses of the application servers and IP addresses of units representing a next hop when tunneling data from the network device to the application servers; and
combinations of the IP addresses of the subnetworks, the IP addresses of the application servers and IP addresses of interfaces of the network device, used for tunneling data from the network device to the application servers.

5. The method of claim 3, wherein the monitoring comprises:
transmitting a path monitoring message on a selected path selected from the paths indicated by the path monitoring information; and
checking if a response to the path monitoring message is received.

6. The method of claim 5, wherein
in case a response to the path monitoring message transmitted on a first path as the selected path is not received, which indicates a path failure on the first path, the first path being between a first subnetwork and a first application server, performing at least one of:
switching to a second path of the paths indicated by the path monitoring information, the second path being between the first subnetwork and the first application server;
re-evaluating the first path;
re-activating the first path;
notifying the path failure on the first path; and
transmitting a path monitoring message on the first path with a cycle lower than a cycle used for transmitting a path monitoring message on a path having no path failure.

7. The method of claim 1, comprising:
when deallocating the IP address of the user equipment upon the user equipment detaching from the core network, checking, based on the path monitoring information, if the IP address of the user equipment is an only one belonging to the selected subnetwork; and
if the IP address is the only one, updating the path monitoring information by deleting all paths indicated by combinations comprising the IP address of the selected subnetwork.

8. A non-transitory computer-readable medium, comprising a program including software code portions for:
upon a user equipment attaching to a core network of a communications network system, allocating an internet protocol (IP) address to the user equipment for tunneling data relating to the user equipment between a network device of the core network and an application server,
wherein the allocating is performed based on path monitoring information for the tunneling of the data, wherein, if the path monitoring information contains an IP address of IP addresses, wherein the IP addresses are associated with subnetworks, a subnetwork is selected from the subnetworks, wherein the selected subnetwork comprises at least one of: a local subnetwork of the network device, and a subnetwork of cellular communications network system, wherein the IP address belongs to the selected subnetwork;

checking if the path monitoring information contains a combination of the IP address of the selected subnetwork and an IP address of the application server; and in case the combination is not contained in the path monitoring information, adding a path indicated by the combination of the IP address of the selected subnetwork and the IP address of the application server to the path monitoring information.

9. A network device of core network of a communications network system, comprising:

at least one processor; and at least one memory including computer program code, wherein the at least one memory and the computer program code are configured to, with the at least one processor, cause the network device at least to perform:

upon a user equipment attaching to the core network, allocating an internet protocol (IP) address to the user equipment for tunneling data relating to the user equipment between the network device and an application server, wherein the allocating is performed based on path monitoring information for the tunneling of the data, wherein, if the path monitoring information contains an IP address of IP addresses, wherein the IP addresses are associated with subnetworks, a subnetwork is selected from the subnetworks, wherein the selected subnetwork comprising at least one of: a local subnetwork of the network device, and a subnetwork of cellular communications network system, wherein the IP address belongs to the selected subnetwork;

checking if the path monitoring information contains a combination of the IP address of the selected subnetwork and an IP address of the application server; and in case the combination is not contained in the path monitoring information, adding a path indicated by the combination of the IP address of selected subnetwork and the IP address of the application server to the path monitoring information.

10. The network device of claim 9, wherein the at least one memory and the computer program code are configured to, with the at least one processor, cause the network device to further perform:

monitoring paths indicated by the path monitoring information.

11. The network device of claim 9, wherein the path monitoring information comprises at least one of the following:

combinations of the IP addresses of the subnetworks and application servers, the combinations indicating paths between the subnetworks and the application servers;

combinations of the IP addresses of the subnetworks, the IP addresses of the application servers and IP addresses of units representing a next hop when tunneling data from the network device to the application servers; and combinations of the IP addresses of the subnetworks, the IP addresses of the application servers and IP addresses of interfaces of the network device, used for tunneling data from the network device to the application servers.

12. The network device of claim 10, wherein the monitoring comprises:

transmitting a path monitoring message on a selected path selected from the paths indicated by the path monitoring information; and checking if a response to the path monitoring message is received.

13. The network device of claim 12, wherein the at least one memory and the computer program code are configured to, with the at least one processor, cause the network device to further perform:

in case a response to the path monitoring message transmitted on a first path as the selected path is not received, which indicates a path failure on the first path, the first path being between a first subnetwork and a first application server, at least one of the following actions:

switching to a second path of the paths indicated by the path monitoring information, the second path being between the first subnetwork and the first application server;

re-evaluating the first path;

re-activating the first path;

notifying the path failure on the first path; and transmitting a path monitoring message on the first path with a cycle lower than a cycle used for transmitting a path monitoring message on a path having no path failure.

14. The network device of claim 9, wherein the at least one memory and the computer program code are configured to, with the at least one processor, cause the network device to further perform:

when deallocating the IP address of the user equipment upon the user equipment detaching from the core network, checking, based on the path monitoring information, if the IP address of the user equipment is an only one belonging to the selected subnetwork; and if the IP address is the only one, updating the path monitoring information by deleting all paths indicated by combinations comprising the IP address of the selected subnetwork.

15. The network device of claim 9, wherein the network device comprises at least one of a packet gateway of an evolved packet core network, a serving gateway node of an evolved packet core network, and a user plane function of a fifth generation core network.

* * * * *